Nov. 1, 1932.    H. B. EYNON    1,885,903
MOTOR BRUSH
Filed March 26, 1931

INVENTOR
Howard B. Eynon
BY Evans & McCoy
ATTORNEYS

Patented Nov. 1, 1932

1,885,903

UNITED STATES PATENT OFFICE

HOWARD B. EYNON, OF WELLSVILLE, NEW YORK

MOTOR BRUSH

Application filed March 26, 1931. Serial No. 525,464.

This invention relates to brushes for electrical machines and the method of making the same, the invention having for its object to provide metal and graphite or carbon brushes with a conductor cable which is securely united to the brush by means of a metallic binding medium of low electrical resistance and high melting point, which has a substantially integral union both with the metal of the cable and the material of the brush whereby there is a very low resistance to the passage of current between the cable and brush and danger of destroying or damaging the connection between the cable and brush due to heating of the metallic binding material is greatly reduced.

A further object of the invention is to provide a method of joining a metallic conductor cable to a brush by which an integral union is provided through the medium of a metallic binding material of low electrical resistance and a high melting point, which is fused both to the metal of the cable and to the material of the brush.

A further object is to provide a method of providing a substantially integral union of low resistance and high melting point between a metallic conductor cable and a carbon brush.

With the above and other objects in view the invention may be said to comprise a brush and method of making the same, as illustrated in the accompanying drawing hereinafter described and particularly set forth in the appended claims, together with such variations and modifications thereof as will be apparent to one skilled in the art to which the invention appertains.

Reference should be had to the accompanying drawing forming a part of this specification in which.

Figure 1:
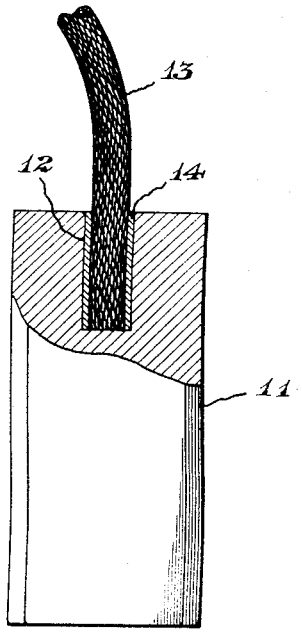
Fig. 1 is a section through a brush which is composed of a mixture of metal and graphite and in which the metal is the main ingredient.

Referring first to Fig. 1 of the drawing, the body 11 of the brush is in the form of a molded block formed by subjecting a mixture of a metal powder and graphite to pressure in a suitable mold. The block 11 has a hole 12 formed in the outer end thereof and this hole receives a conductor cable 13 which is preferably composed of strands of copper wire and which is permanently secured to the block 11 by means of a metallic binder 14 filling the opening around the cable and integrally joined by fusion with the metal of the cable and material of the brush. The metallic binding material is preferably a solder of high melting point and low resistance in order to reduce the amount of heat generated by the passage of electric current between the brush and cable, and to provide a connection which will not be damaged by the temperatures to which the brush is subjected in service.

A serious difficulty heretofore experienced in the use of composition commutator brushes has been the tendency of the solder joining the cable to the body of the brush to melt and drop out of the brush due to heat generated in the joint by the passage of current, the loss of solder causing an imperfect electrical connection between the cable and the brush, and also loosening the connection between the cable and brush.

The present invention provides a union between the cable and brush in which the resistance to the passage of current is very low and in which the solder has a melting point so high that it is not damaged by heat generated in the brush during operation. The binding composition is preferably composed of a mixture of copper and tin, together with a small amount of a suitable fluxing material, the copper content being somewhat in excess of the tin.

In the process of joining the cable to the body of the brush the cable is inserted in the hole 12 and the binding composition in powdered form is tamped by a suitable tamping machine tightly around the cable in the hole.

One very satisfactory composition which may be employed consists of six parts of copper powder which has been passed through a 150 mesh sieve, four parts of tin in powdered form which has been passed through a 150 mesh sieve, and one part of sal-ammoniac or other suitable fluxing material. The copper powder is preferably made by the reduction of copper oxide to copper which produces a copper powder which is porous and compressible. The copper, tin and sal-ammoniac are thoroughly mixed and ground in a mortar to produce a uniform mixture before it is tamped in the hole around the cable. After the binding material is tamped in the hole of the block around the cable, the brush with the cable attached thereto is placed in a container and heated under a reducing atmosphere to substantially 270 degrees centigrade, which is sufficient to melt the binding mixture and cause the same to be integrally united with the metal of the cable and with the material of the brush to form a permanent union between the cable and the brush.

Where the brush is composed of metal and graphite, with the graphite in excess of the metal, or when the brush is composed mainly of carbon, the method of joining the conductor cable to the brush is similar to that above described except that in this case it is necessary to coat the wall of the hole in the brush with a thin layer of copper by spraying molten copper into the hole.

Figure 2:
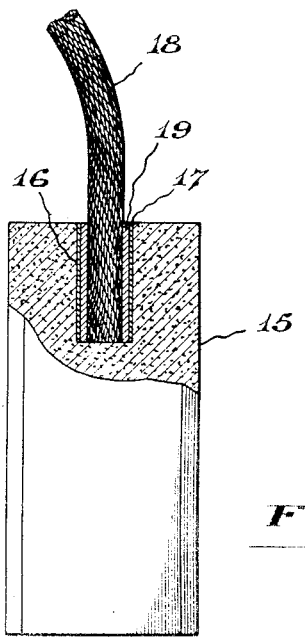
Fig. 2 is a section through a brush similar to that shown in Fig. 1, except that in this modification the brush is composed mainly of carbon.

As shown in Fig. 2 of the drawing, the body 15 of the brush, which in this instance is either a carbon brush or a metal graphite brush composed mainly of graphite, is provided with a hole 16 in the outer end thereof and this hole has a copper lining 17 formed by spraying molten copper into the hole and a conductor cable 18 composed of strands of copper wire is permanently secured to the brush by means of a metallic binder 19 of substantially the same composition as that employed in the metal graphite brush above described. In this modification the method of joining the cable to the brush is exactly the same as that above described except for the coating of the hole with copper prior to the attachment of the cable in order to provide an intimate union between the binding medium and the material of the block. The fusion of the binding material in a reducing atmosphere causes the solder to integrally unite with the copper of the cable and with the copper lining the wall of the hole, so that the body of the brush is joined to the cable by means of a solder of low resistance and high melting point which is not excessively heated by the electric current and which is not damaged by heat in service.

It will be apparent that the present invention provides means of joining a conductor cable to a composition brush in which the interposed binding medium offers a minimum resistance to the passage of the current and is capable of withstanding temperatures greatly in excess of those ordinarily occurring in service without damage thereto.

Furthermore, it is to be understood that the particular form of product shown and described, and the particular procedure set forth, are presented for purposes of explanation and illustration and that various modifications of said product and procedure can be made without departing from my invention as defined in the appended claims.

I claim:

1. The herein described method of making brushes for electrical machines which comprises moulding a block composed of uniformly interspersed particles of metal and graphite and providing an opening therein, inserting a metallic conductor cable in said opening, tamping a mixture composed of copper and tin in powdered form and containing a small quantity of a fluxing material around the cable in said opening and heating said block cable and mixture in a reducing atmosphere to a temperature sufficient to melt said mixture.

2. The herein described method of attaching conductor cables to molded blocks which form the bodies of commutator brushes which comprises forming a hole in a moulded block, inserting a metallic conductor cable in the hole, tamping in the hole around the cable a mixture composed substantially of six parts of copper powder in a porous compressible state, four parts of tin and one of sal-ammoniac, and melting said mixture by heating the same in a reducing atmosphere.

3. The herein described method of making brushes for electrical machines which comprises molding a mixture of copper and graphite in powdered form into a block, forming a hole in the block, inserting a conductor cable composed of strands of copper wire into said hole, tamping a binding material around said cable composed of substantially six parts of a porous copper powder formed by reduction of copper oxide, four parts of powdered tin and one part of sal-ammoniac, and melting said binding material by subjecting the block to heat in a reducing atmosphere.

4. The herein described method of making brushes for electrical machines which comprises molding into a block a mixture of copper and graphite in which the copper content exceeds the graphite content, forming a hole in said block, inserting into said hole a conductor cable composed of strands of copper wire, tamping around said cable a binding material composed mainly of copper and tin in powdered form and containing a small amount of a fluxing material, and heating the block in a reducing atmosphere to a temperature sufficient to melt said binding material.

5. The herein described method of making brushes for electrical machines which comprises molding into a block a mixture composed mainly of carbon, forming a hole in said block, applying a copper coating to the wall of said hole by spraying moulten copper into the hole, inserting into the hole a conductor cable composed of strands of copper wire, tamping in the hole around the cable, a binding material composed of copper and tin in powdered form and containing a small amount of fluxing material, and heating the block in a reducing atmosphere to a temperature sufficient to melt the binding material and cause the same to integrally unite with the metal of the cable and the metal of said lining.

In testimony whereof I affix my signature.

HOWARD B. EYNON.